(12) United States Patent
Givet

(10) Patent No.: US 6,473,862 B1
(45) Date of Patent: Oct. 29, 2002

(54) SECURITY ASSEMBLY PARTICULARLY FOR ELECTROSENSITIVE PROTECTION EQUIPMENT

(75) Inventor: Jean-Bernard Givet, Corenc (FR)

(73) Assignee: Schneider Electric SA, Boulogne Billancourt (FR)

(*) Notice: Subject to any disclaimer, the term of this patent is extended or adjusted under 35 U.S.C. 154(b) by 0 days.

(21) Appl. No.: 09/264,005

(22) Filed: Mar. 8, 1999

(30) Foreign Application Priority Data

Mar. 11, 1998 (FR) .......................................... 98 02961

(51) Int. Cl.$^7$ .......................... G06F 11/00; G06F 11/16
(52) U.S. Cl. .......................... 713/200; 714/11; 714/12; 714/46; 714/819; 714/820
(58) Field of Search ............................. 714/47, 10, 46, 714/797, 821, 3, 30, 703, 12, 11, 819, 820; 713/200

(56) References Cited

U.S. PATENT DOCUMENTS 3,805,235 A * 4/1974 Foster et al. ................. 244/194
4,096,989 A * 6/1978 Tawfik ........................ 318/563
4,466,098 A * 8/1984 Southard ..................... 379/279
5,613,064 A * 3/1997 Curtin ......................... 714/30

FOREIGN PATENT DOCUMENTS

EP          0 455 174      11/1991
WO          WO 86/04432     7/1986

* cited by examiner

*Primary Examiner*—Ly V. Hua
(74) *Attorney, Agent, or Firm*—Oblon, Spivak, McClelland, Maier & Neustadt, P.C.

(57) ABSTRACT

An assembly comprising two micro-controllers ($MC_1$, $MC_2$) separately receiving specific and synchronous information (input states) in order to process it and supply respective outputs ($S_1$, $S_2$) and which are connected through links ($C_1$, $C_2$) to make the running of the programs consistent, and a comparator (K) receiving the outputs ($S_1$, $S_2$) from the micro-controllers ($MC_1$, $MC_2$) in order to transmit a signal in the event of nonconformity.

Figure 1:
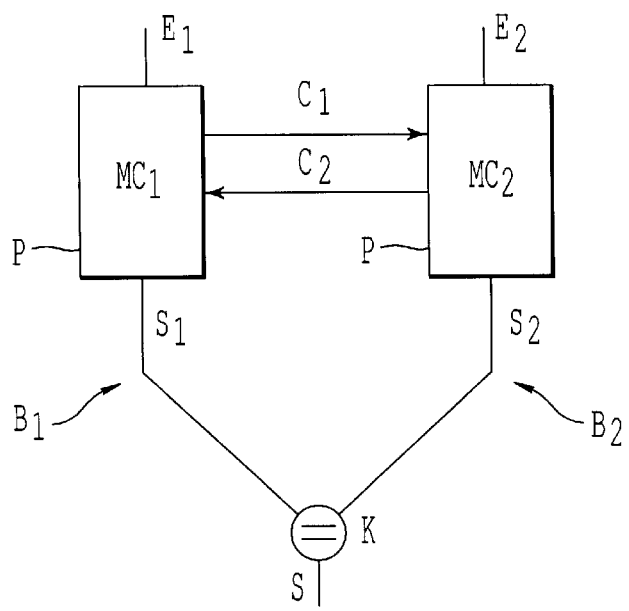

A re-writable memory is respectively associated with each micro-controller ($MC_1$, $MC_2$). An interface common to the two micro-controllers ($MC_1$, $MC_2$) is connected to them through a common micro-controller $MC_3$ in order to write the parameterization data for the functions of the two mic-o-controllers ($MC_1$, $MC_2$) by means of the common micro-controller ($MC_3$).

4 Claims, 3 Drawing Sheets

SECURITY ASSEMBLY PARTICULARLY FOR ELECTROSENSITIVE PROTECTION EQUIPMENT

This invention relates to a security assembly notably for electrosensitive protection equipment, comprising
- two micro-controllers separately receiving specific and synchronous information (input states) in order to process it and supply respective outputs the two micro-controllers being connected through links to make the running of the programs processing the two states of input into the micro-controllers consistent,
- a comparator receiving the outputs from the micro-controllers in order to transmit a signal in the event of nonconformity.

Such security assemblies are notably fitted to dangerous machines. They receive information from sensors and process the received signals in order to validate the operation of the installation, to stop it or to prohibit it.

According to the security category into which these security assemblies are classified, the regulations are more or less strict and in the most strict category, any operational incident must be treated as the detection of a person penetrating the area of the machine that is being protected.

For this, known security assemblies such as those mentioned above, have a redundant structure. The pieces of information are processed along two paths in a synchronous manner, and the two paths exchange operating information. Then the outputs are compared in order to verify consistency.

In order to modify the operation of the security assembly, it is necessary to inject a new parameterization onto each of the channels fitted to a micro-processor. This introduction is relatively long and tedious since it is carried out, for example, with the help of switches which limits the possibilities in addition to causing the inconvenience mentioned above.

The purpose of this invention is to remedy these disadvantages and to aim to create a security assembly of the type specified above, that allows one to modify the parameterization of the security assembly in order to adapt it easily to new configurations and to make the assembly applicable to numerous situations indeed to make it polyvalent.

To this effect, the invention relates to such a security assembly, characterized in that it comprises
- a re-writable memory linked respectively to each micro-controller
- an interface common to the two micro-controllers, connected to them through a common micro-controller in order to enter the parameterization data of the functions of the two micro-controllers by means of the common micro-controller.

The invention thereby allows one to modify the operation of the security assembly in an simple way by the one-time introduction of the parameterization data through the use of the interface. These data are communicated through the micro-processor common to the microprocessors linked to each of the two channels which enter these configuration data into their respective re-writable memories. During this up-date or this operational modification to the security assembly, outputs are prohibited and the assembly functions on reception of parameterization messages.

The bilateral writing with exchange permits assured entry of the message which is doubly written and recognized. Each message is made up of a cyclic redundancy code that permits verification and in the event of nonconformity, the rejection of the code.

At the end of this parameterization the security assembly is once again available to provide the security function by processing the input states and the synchronism of the processing by the direct exchange of data between the two microprocessors for the two parallel processing channels.

In accordance with other advantageous characteristics
- a re-writable memory is respectively linked to each micro-controller
- an interface common to the two micro-controllers is connected to them through a common micro-controller to enter the parameterization data of the functions of the two micro-controllers by means of the common micro-controller.

Figure 2:
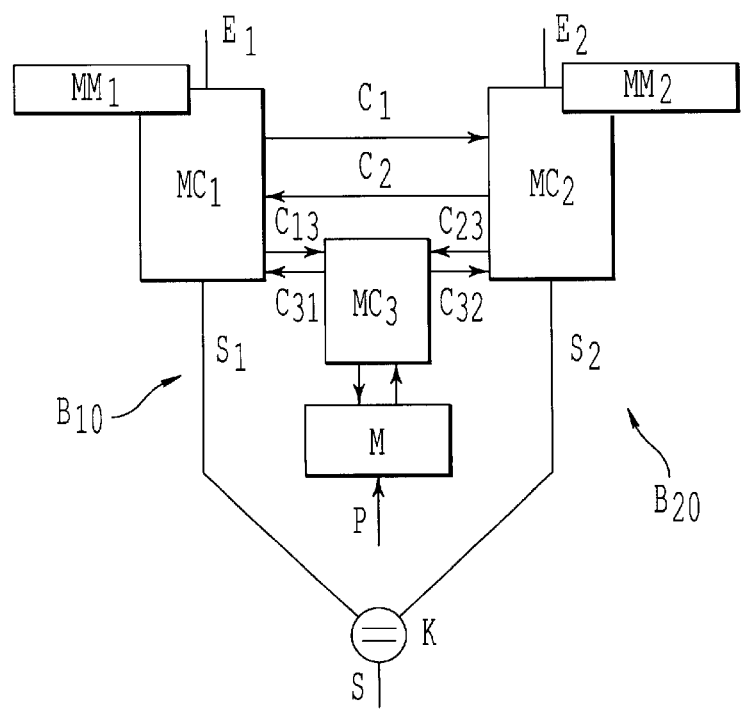
Figure 3:
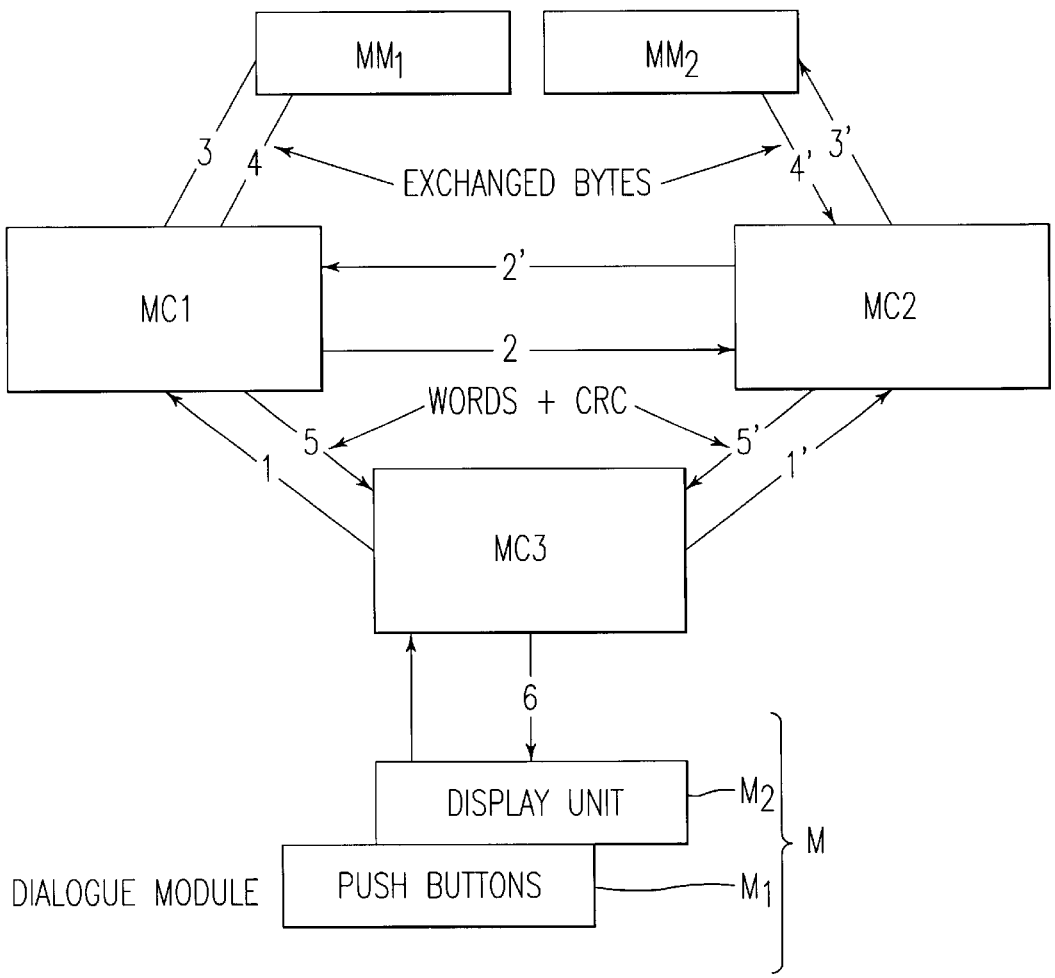
Figure 4:
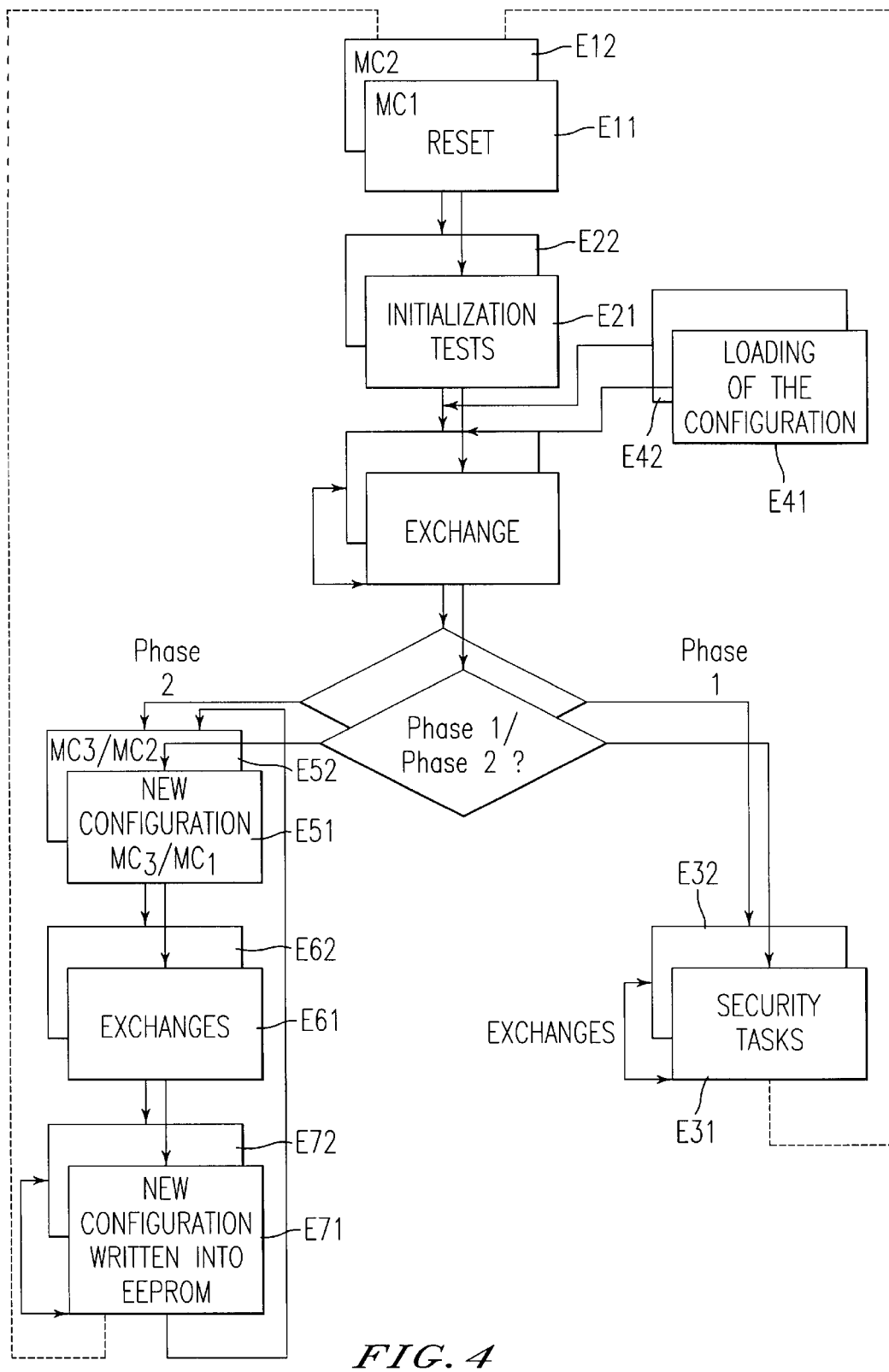

This invention will be described below in a more detailed manner with the help of the appended drawings in which FIG. 1 is a diagram of a known security assembly, FIG. 2 is a diagram of a security assembly according to the invention, FIG. 3 shows the configuration phase of the security assembly, FIG. 4 shows the general algorithm of the security assembly according to the invention.

According to FIG. 1, a known security assembly, intended for the applications mentioned above is made up of two branches $B_1$, $B_2$ each having a micro-controller $MC_1$, $MC_2$. These two branches receive the respective input states $E_1$, $E_2$, supplied by sensors fitted to the installation or the machine being kept secure. The micro-controllers $MC_1$, $MC_2$ supply the outputs $S_1$, $S_2$. The output signal S triggers an operation in the event of nonconformity between the outputs $S_1$, $S_2$ in the comparator K. This signal can be an alarm signal or a signal to shut-down the machine or the installation.

In order to modify the configuration of the security assembly, in accordance with the known technique, it is necessary to introduce the parameterization data P separately into each of the micro-controllers $MC_1$, $MC_2$. This operation is long, delicate and tedious.

Finally, the synchronization of the processing carried out by each of the micro-controllers $MC_1$, $MC_2$ in the branches $B_1$, $B_2$ is ensured by synchronization signals $C_1$, $C_2$ exchanged directly between the two micro-controllers $MC_1$, $MC_2$.

FIG. 2 shows diagrammatically a security assembly according to the invention. This assembly is also made up of two channels $B_{10}$, $V_{20}$ each fitted with a micro-controller $MC_1$, $MC_2$ exchanging synchronization signals $C_1$, $C_2$ with one another in order to synchronize the processing of the input signals (input states) $E_1$, $E_2$ which are applied to them.

Each micro-controller $MC_1$, $MC_2$ is linked to a respective re-writable memory $MM_1$, $MM_2$. In a preferred manner, these memories are of the EPROM type.

The two micro-controllers $MC_1$, $MC_2$ are linked to a common micro-controller $MC_3$ with which each micro-controller $MC_1$, $MC_2$ separately exchanges information $C_{13}$, $C_{31}$ or $C_{23}$, $C_{32}$.

The common micro-controller $MC_3$ is connected to an interface M, for example, a group of push buttons and a display to receive the parameterization data P. In order to be able to communicate easily with $MC_3$, a pull-down menu y is integrated with it. It includes the functions that can be parameterized that are non-imitative, access to certain of them being through a confidential access code.

The outputs $S_1$, $S_2$ from the micro-controllers $MC_1$, $MC_2$ are connected to a comparator K which supplies an output signal S that represents the conformity of the signals $S_1$, $S_2$ or their nonconformity.

This security assembly operates in the following way, separately in two situations.

In a first case, $MC_3$ is active and there is dialogue respectively with the micro-controllers $MC_1$, $MC_2$. During this exchange, the outputs $S_1$, $S_2$ are made inactive. This dialogue between the common micro-controller $MC_3$ and the micro-controllers $MC_1$, $MC_2$ of each of the channels $V_1$, $V_2$ can be expressed as the entering of information into the re-writable memories $MM_1$, $MM_2$.

In a second case, the common micro-controller $MC_3$ does not exchange information with the micro-controllers $MC_1$, $MC_2$ which work separately and in synchronism by exchanging data and information $C_1$, $C_2$. In this phase $MC_1$ and $MC_2$ generate information blindly to $MC_3$ through channels $C_{13}$ and $C_{23}$, $MC_3$ picking up this information at random. In these exchanges $MC_1$ and $MC_2$ are exclusively transmitters and $MC_3$ is exclusively a receiver.

The parameterization of the functions of the microprocessors $MC_1$, $MC_2$ takes place, as indicated above, by the entering of parameterization data P through the interface M and the common micro-processor $MC_3$.

The operation of the security assembly described above and its parameterization is shown in FIG. 3.

Hence, through interface M, using the push-buttons $M_1$ or any other input means, a message is entered in the micro-controller $MC_3$ which sends messages 1, 1' to micro-controllers $MC_1$, $MC_2$. They exchange signals in directions 2, 2' in order to verify the homogeneity of the procedure. Then, the micro-controllers $MC_1$, $MC_2$ each send a message 3, 3' in order to enter it in the associated re-writable memory $MM_1$, $MM_2$. The memories $MM_1$, $MM_2$ then send messages 4, 4' to their respective micro-controllers $MC_1$, $MC_2$ which again exchange information 2, 2' and verify the return message and then send the message received in this way (in the form of words with a control code 5, 5') to the common micro-controller $MC_3$. After verification micro-controller $MC_3$ displays the message on the screen $M_2$. The message displayed is that entered into the memories $MM_1$, $MM_2$.

The operations in FIG. 3 are summarized below:

| 1 | Message transmitted to $MC_1$ and $MC_2$ | 1' |
| 2 | $MC_1$ and $MC_2$ mutually check the existence of message 2' | 2' |
| 3 | Writing into the respective EEPROMs | 3' |
| 4 | Verification of the value that has just been recorded in the EEPROM by $MC_1$ and $MC_2$ | 4' |
| 5 | Return of the message from $MC_1$ and $MC_2$ to $MC_3$ | 5' |
| 6 | Display of the memorized message | |

This bilateral writing with exchange permits sure entry of the message. In effect the message is double entered and recognized. Furthermore, each message 1 and 5 is made up of a code that has a Hamming distance of 4 with respect to the other codes. This is obtained by a cylic redundancy code (word+CRC), that is to say that each code caries within itself its authentication and if this verification does not terminate, the code is rejected.

The flow graph in FIG. 4 shows the operation of security assembly, distinguishing between normal operation (nominal working condition) and configuration the loading of parameters P.

Firstly, through the RESET step $E_{11}$, $E_{12}$ corresponding to power up, the program initializes the peripherals and carries out the test of the storage areas ($E_{21}$, $E_{22}$). The configuration in the re-writable memory present at this time ($E_{41}$, $E_{42}$) is changed and if the micro-controller $MC_3$ has not been acted upon by the push buttons $M_1$ of the interface M to carry out the passage Into phase 2, one passes to the security processing phase (phase 1) and the carrying out of security tasks $E_{31}$, $E_{32}$. One only quits this operation by a return to the initial condition RESET generated by the common micro-controller $MC_3$.

On the other hand, if after the initialization tests $E_{21}$, $E_{22}$ and the loading of the existing configuration $E_{41}$, $E_{42}$ if the micro-controller $MC_3$ has been acted upon through the interface M, that is to say the push buttons $M_1$ in order to effect passage into phase 2, then one passes into phase 2. First of all, the new configuration is transmitted to the micro-controllers $MC_1$ $MC_2$ through the common micro-controller $MC_3$ (step $E_{51}$, $E_{52}$). This loading is followed by exchanges $E_{61}$, $E_{62}$ then the entering of the new configuration into the re-writable memory, step $E_{71}$, $E_{72}$. If necessary, the loop starts again for the new configuration or one quits this loop through a RESET signal sent through micro-controller $MC_3$.

Hence, in conclusion, the micro-controllers $MC_1$, $MC_2$ work in accordance with two operational phases that are distinct in time. They can work either in accordance with a nominal security phase or in accordance with a configuration phase with the entering of parameters. The execution of one or the other of these two phases is independent and the passage from one phase to the other takes place exclusively through the RESET signal.

What is claimed is:

1. A security assembly notably for electrosensitive protection equipment, comprising two micro-controllers ($MC_1$, MC2) separately receiving specific and synchronous information (input states) for processing said synchronous information and supplying respective outputs ($S_1$, $S_2$), the two micro-controllers ($MC_1$ $MC_2$) being connected through links ($C_1$, $C_2$) to make the running of the programs consistent, processing the two input states in the micro-controllers ($MC_1$, $MC_2$), and a comparator (K) receiving the outputs ($S_1$, $S_2$) from the micro-controllers ($MC_1$, MC2) for transmitting a signal in the event of nonconformity between the two outputs ($S_1$, $S_2$), and wherein said security assembly comprises a re-writable memory respectively associated with each micro-controller ($MC_1$ $MC_2$), and an interface (M) common to the two micro-controllers ($MC_1$, MC2) and connected to the two micro-controllers through a common micro-controller MC3, for entering parameterization data for the functions of the two micro-controllers ($MC_1$, $MC_2$) performed by means of the common micro-controller ($MC_3$).

2. A security assembly according to claim 1 wherein the interface is formed by push buttons and a display unit.

3. A security assembly according to claim 1 wherein the third micro-controller ($MC_3$) engages in dialogue with the two micro-controllers ($MC_1$, $MC_2$) which each enter information into respective memories ($MM_1$, $MM_2$) while the outputs ($S_1$, $S_2$) from the two micro-controllers ($MC_1$, $MC_2$) are inactive.

4. A security assembly according to claim 1 wherein the micro-controllers ($MC_1$, $MC_2$) work in accordance with operational phases that are distinct in time, a nominal security phase a configuration phase, for the entering of the parameters, the execution of these two phases being totally independent and the passage from one phase to the other being made exclusively by the RESET signal.

* * * * *